United States Patent [19]
Little

[11] Patent Number: 5,893,487
[45] Date of Patent: Apr. 13, 1999

[54] FLUID DISPENSING SYSTEM

[75] Inventor: David John Little, Gwynedd, United Kingdom

[73] Assignee: Munster Simms Engineering Limited, County Down, United Kingdom

[21] Appl. No.: 08/952,390

[22] PCT Filed: May 17, 1996

[86] PCT No.: PCT/GB96/01194

§ 371 Date: Mar. 23, 1998

§ 102(e) Date: Mar. 23, 1998

[87] PCT Pub. No.: WO96/36558

PCT Pub. Date: Nov. 21, 1996

[30] Foreign Application Priority Data

May 17, 1995 [GB] United Kingdom ............... 9509945
Jul. 21, 1995 [GB] United Kingdom ............... 9514963
Jul. 27, 1995 [GB] United Kingdom ............... 9515418

[51] Int. Cl.$^6$ ............................................. G01F 11/10
[52] U.S. Cl. ........................................... 222/367
[58] Field of Search .............................. 222/367, 369, 222/344, 353; 141/237–245, 284, 34

[56] References Cited

U.S. PATENT DOCUMENTS

| | | | |
|---|---|---|---|
| 838,191 | 12/1906 | Kirkegaard | 222/367 X |
| 1,372,768 | 3/1921 | Mott | 222/367 X |
| 1,826,346 | 10/1931 | Guermont | 222/369 X |
| 2,319,830 | 5/1943 | Sampsel | 222/369 X |
| 2,327,124 | 8/1943 | Morse | 222/369 X |
| 2,581,674 | 1/1952 | King | 222/367 X |
| 2,699,279 | 1/1955 | Dodge et al. | 222/367 X |
| 2,828,049 | 3/1958 | Midgley | 222/367 X |
| 3,426,688 | 2/1969 | Jones | 222/367 X |
| 3,580,546 | 5/1971 | Fraser et al. | 222/367 X |

FOREIGN PATENT DOCUMENTS

| | | |
|---|---|---|
| 2160243 | 6/1973 | France. |
| 328687 | 5/1930 | United Kingdom. |
| 383090 | 11/1932 | United Kingdom. |

*Primary Examiner*—Kevin P. Shaver
*Attorney, Agent, or Firm*—Edwin E. Greigg; Ronald E. Greigg

[57] ABSTRACT

A fluid dispensing system comprising a tank for the fluid, and means for extracting a quantity of fluid from the tank and for directing the extracted fluid to one or more selected receptacles. The means comprises a fluid collecting device including a vessel having a restricted entry aperture, the vessel being for rotary passage through the tank. An outlet pipe is positioned exteriorly of the tank whereby, in use with fluid in the tank, during a rotary cycle of the vessel air exhausts from the vessel through the outlet pipe as fluid ingresses into the vessel through the aperture during a filling operation, and air flows into the vessel through the aperture as fluid is dispensed through the outlet pipe in a dispensing operation.

23 Claims, 5 Drawing Sheets

5,893,487

FLUID DISPENSING SYSTEM

BACKGROUND OF THE INVENTION

This invention concerns fluid dispensing systems which are particularly, but not exclusively, suitable for incorporation in drinks vending machines.

The term "fluid" as used herein is intended to include liquids, such as water, perfume and other low viscosity liquids.

Fluid dispensing systems have been proposed heretofore. U.S. Pat. No. 1,327,768 discloses a tank for holding liquid through which a wheel arrangement is adapted to rotate, the arrangement having a hub disc mounted on a solid shaft, the disc supporting six conduits in equi-spaced relationship radially of the shaft. At the one end of each conduit remote from the disc a measuring container is mounted having a restricted entry. The conduits are similarly cranked and pass through the disc parallel to the axis of the shaft with fluid collected in the containers being sequentially discharged from the respective conduit into a chamber to be discharged therefrom through a discharge pipe.

FR-A-2 160 243 discloses a pair of tanks for liquid into each of which a wheel arrangement including a disc is adapted to rotate, the arrangements being unitary with the two discs connected through a hub and rotatable in a central mounting by a solid shaft secured to one of the discs. Each arrangement has three containers mounted on the respective disc and is rotated through the respective tank to sequentially collect liquid through two openings (25 and 9) in each container and discharge liquid collected through respective conduits into a single collection tank 16.

Drinks vending machines, whether free-standing or table-top supported, generally operate by dispensing water and powdered ingredients from separate sources to a mixing zone. The mixing zone may be separate from a drinks cup in which the drink will be supplied or may be the drinks cup itself. Either way it is important that a pre-selected amount of water is discharged to the mixing zone so that the drink produced is of the required strength and to avoid water spillage in or from the vending machine.

It is further desirable that the fluid dispensing system operate relatively simply in order to reduce the risk of breakdown.

Typically drinks vending machines and other fluid dispensers use solenoid valves for controlling flow of fluid but these valves are prone to becoming clogged and so, without warning, stick in one position.

An object of this invention is to provide a simple fluid dispensing system suitable for a drinks vending machine and other applications.

According to this invention, there is provided a fluid dispensing system comprising a tank for the fluid, and means for extracting a quantity of fluid from the tank and for directing the extracted fluid to one or more selected receptacles, the means comprising a fluid collecting device including a vessel and an outlet pipe in fluid communication, the vessel being for rotary passage through the tank and having a restricted entry aperture wherein the vessel and outlet pipe are connected through a rotatable tubular shaft which extends between opposed walls of the tank and is journalled for rotation therein with one of its ends closed off and the other projecting through the respective tank wall, the vessel being mounted on the shaft with the outlet pipe being connected to the projecting end of the shaft exteriorly of the tank to extend diametrically away from the vessel, rotary passage of the vessel causing rotary passage of the outlet pipe outside of the tank, whereby, in use with fluid in the tank, during a rotary cycle of the device air exhausts from the vessel through the outlet pipe as fluid ingresses into the vessel through the aperture during a filling operation, and air flows into the vessel through the aperture as fluid is dispensed through the outlet pipe in a dispensing operation.

Preferably, the fluid is raised from a supply thereof in the tank and discharged by gravity to the one or more selected receptacles.

Preferably also, the vessel is closed and the restricted entry aperture is a circular hole. The amount of fluid which ingresses into the vessel beneficially depends on the size of the hole and the dwell time during which the vessel is in the fluid in the tank. The volume of fluid retained in the vessel when moving from a filling position to a dispensing position desirably depends on the size of hole and the speed of rotation.

The tank is desirably of two part construction comprising an upper part to which a lower fluid-holding part is removably secured. The upper part is beneficially mounted on a support, for example a supporting part of a drinks vending machine.

In a preferred embodiment, the vessel is sectoral in side elevation, and is mounted at its vertex on the rotatable tubular shaft. The wall of the shaft within the vessel is perforate to admit fluid with a single or multiple openings. Further, the single opening is elongate, preferably along its length. The vessel has preferably two sectoral sides spaced apart by radial walls and an arcuate wall in which the opening is provided. The vessel being rotatable about the axis of the shaft preferably passes through the fluid from a park position where it is normally out of the fluid to one or more selected positions of a plurality of dispensing positions to discharge through the outlet pipe fluid collected during its rotation between said park and dispensing positions.

The shaft preferably extends through the upper part of the tank to be closed on the outside of the rear side thereof and to be connected on the outside of the front side of the tank to the outlet pipe, preferably at right angles to the shaft.

The shaft is preferably rotated by a motor, preferably an electrically operated motor that is program controlled. A position sensing device, for example a magnetic sensor, may be used to reference the position of the shaft during rotation. The shaft may have a toothed wheel thereon with a toothed belt drive employed to mesh with a toothed output gear of the motor to rotate the wheel. The motor may conveniently be mounted on the outside of a side of the tank.

The fluid dispensing system of the invention preferably has a plurality of upright elongate chambers for receiving fluid from the outlet. The chambers are preferably arranged in a manifold of individual chambers. Preferably, the tops of the chambers are arranged radially relative to the axis of rotation of the shaft. Desirably, the chambers each has an outlet for transferring any fluid received to a mixing zone where it is mixed with powdered and/or possibly other liquid ingredients to produce a mixture, i.e. a desired drink in the case of being incorporated in a drinks vending machine, or other desired mixture in other cases.

The motor is preferably programmed to rotate the vessel from its 'park' position through a reference position and a filling position to one or more discharge positions according to the desired combination of chambers necessary for producing the selected mixed product.

The outlet pipe may have a volume control, such as by means of a restrictor screw say through a side of the outlet pipe, whereby the amount of air to be displaced in allowing fluid into the outlet may be controlled.

BRIEF DESCRIPTION OF THE DRAWINGS

This invention will now be further described, by way of example only, with reference to the accompanying drawings, in which.

DETAILED DESCRIPTION OF THE INVENTION

Figure 1:
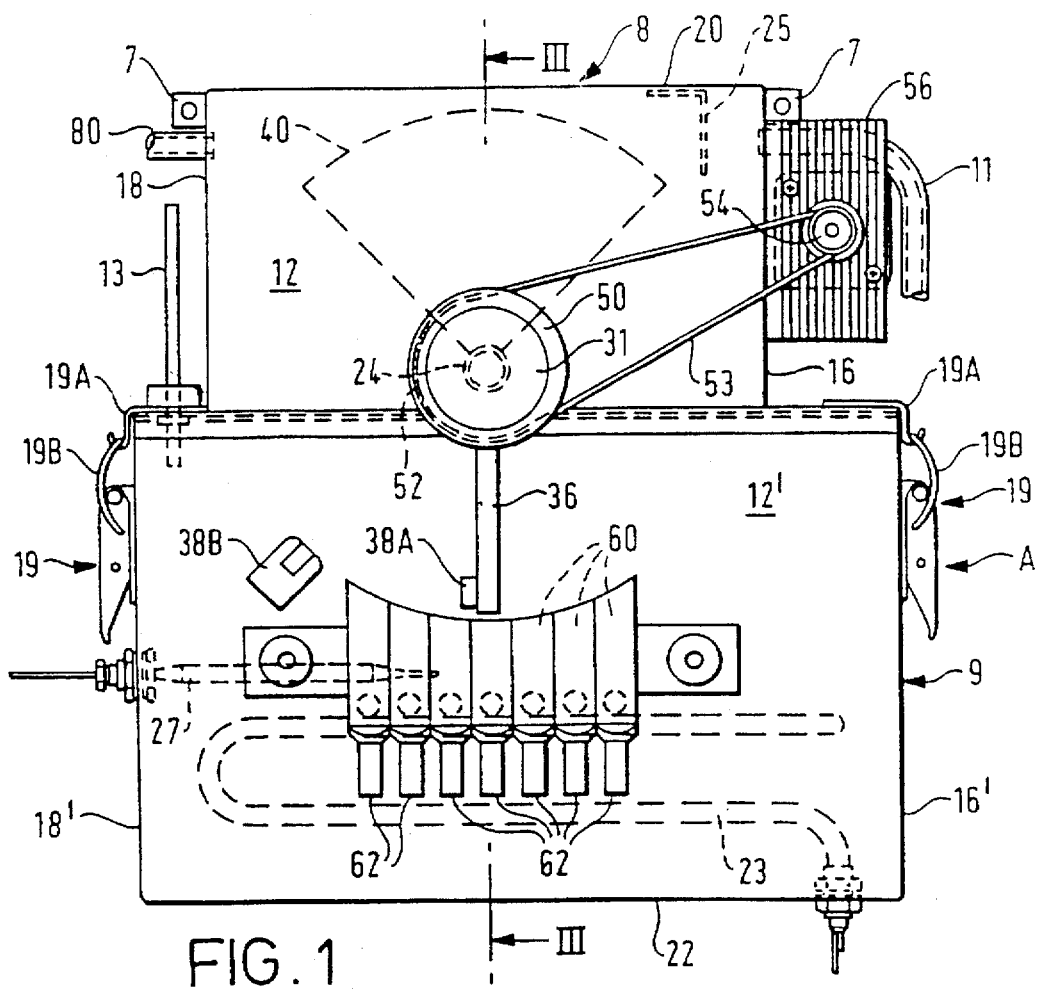
FIG. 1 is a front view of a fluid dispensing system for a drinks vending machine.
Figure 4A:
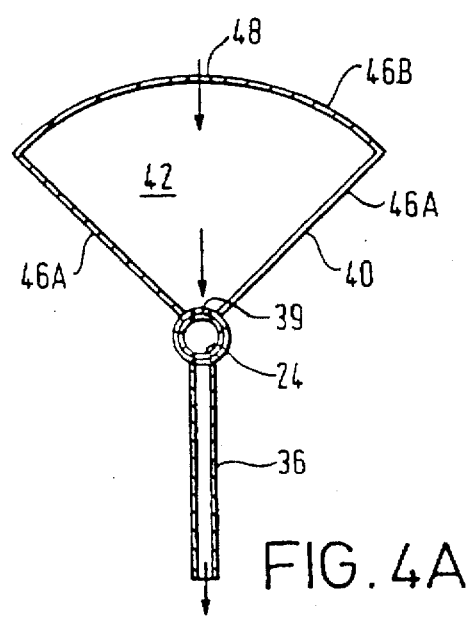
FIGS. 4A and 4B are respectively a front view and a side view of a fluid collecting device.
Figure 4B:
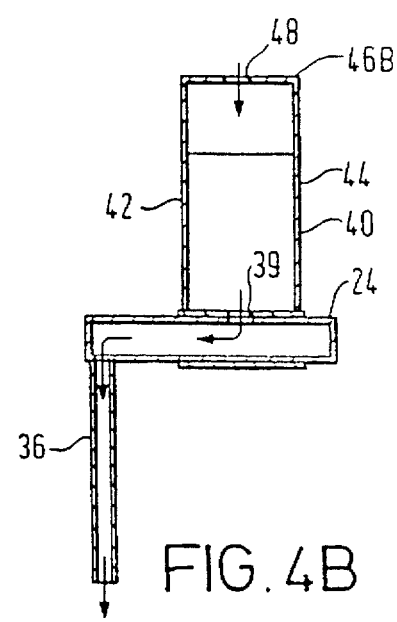

Referring to the accompanying drawings, a fluid dispensing system for a drinks vending machine for multiple station vending has a fluid tank 10 for holding water. The tank 10 is enclosed and is of generally rectangular section comprising two parts, an upper part 8 to which a lower fluid-holding part 9 is removably secured in a watertight fashion. The upper part 8 is mounted by brackets 7 on a supporting part of the drinks vending machine. The upper part 8 of the tank 10 has a front face 12, a rear face 14, sides 16 and 18, and a top 20. The lower part 9 of the tank 10 has a front face 12', a rear face 14', sides 16' and 18' and a bottom 22. The open mouth of the lower part 9 defined by the top edges of the two faces 12', 14' and two sides 16', 18' has an inwardly extending flange 15. The open mouth of the upper part 8 defined by the bottom edges of the two faces 12, 14 and two sides 16, 18 has an outwardly extending angular shoulder 17. An O-ring or other suitable gasket 29 is provided between the flange 15 and the shoulder 17 to provide a watertight seal when the lower part 9 is secured to the upper part 8 by clips 19, each comprising a hook 19A and a clamping pivoted toggle with ring 19B. The tank 10 has an inlet 11 integrated into a mains water supply. A fluid level sensing device, for example an electrical probe 13, is electrically connected to a replenishment valve for controlling water replenishment from the mains water supply through the inlet 11 to maintain a desired level of water 21 in the tank 10.

The tank 10 further includes an electrically operated immersion heater 23, governed by a thermo-coupling 27, in order to maintain the water 21 at a desired temperature for making hot drinks. The inlet 11 is positioned near to the top of side 16 and a baffle 25 is provided depending from the top 20 (FIG. 1) to direct the water 21 downwardly. The immersion heater 23 is positioned adjacent to the bottom 22 of the lower part 9 of the tank 10.

A fluid collecting device includes a tubular shaft 24 extending from the rear face 14 of the upper part 8 of the tank 10 through its front face 12. The shaft 24 is rotatably mounted in a first bearing 26 on the rear face 14 and a second bearing 28 on the front face 12. A cap 34 closes off the end of the shaft 24 beyond the first bearing 26. Beyond the second bearing 28, the shaft 24 is fitted with a cylindrical block 31 having a right angle bend conduit 33 exiting radially to which an outlet pipe 36 is fitted. The wall of the shaft 24 is perforate having one opening 39 provided intermediate its ends, and has mounted on it a vessel 40. The vessel 40 is sectoral in side elevation and has two sectoral sides, namely a front wall 42 and a rear wall 44 spaced apart by two radial walls 46A and an arcuate wall 46B. The arcuate wall 46B has an aperture, in the form of a circular hole 48, about mid-way of its length. The vessel 40 is mounted with the shaft through a vertex thereof where the radial walls 46A meet.

Outside the front face 12 of the tank 10 and mounted on the shaft 24 is a wheel 50 which has teeth 52 around its periphery. For ease of illustration, the teeth are only shown extending around a minor portion of the periphery. These teeth 52 mesh with a toothed belt 53 also arranged around a toothed gear 54 on a shaft of an electrically-operated motor 56 fixed on side 16 of the upper part 8 of the tank 10.

Below the wheel and arranged radially is a series of seven chambers 60, each of which has a lower outlet nozzle 62. The chambers 60 formed by square tubes 72 arranged side-by-side in a manifold with their tops shaped to form an arc corresponding to the path traced out by the end of the pipe 36 during rotation.

A vent 80 is provided in the upper part 8 of the tank 10 through which air can be drawn in/exhausted.

A position sensing device, for example a magnetic sensor, is provided for use to reference the position of the outlet pipe during rotation. This is of a two part component arrangement with one part 38A being mounted on the outlet pipe 36 and the other part 38B being mounted on the lower part 9 of the tank 10 as shown.

The illustrated fluid dispensing system forms part of a drinks vending machine which operates conventionally. The vending machine will usually be coin/token/card operated and will discharge both hot water and powdered material to be mixed either before entry into or in a plastic cardboard or paper cup preferably, but not necessarily, also supplied automatically from the machine.

Figure 5A:
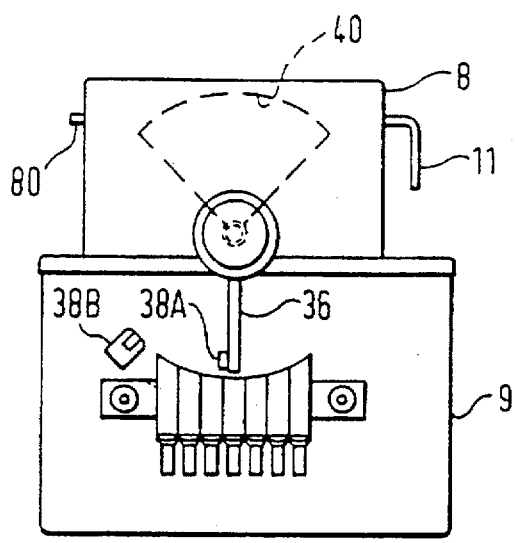
FIGS. 5A, 5B, 5C and 5D are all schematic diagrams, to a smaller scale, of the dispensing system with parts omitted for clarity and showing respectively in sequence four positions of the fluid collecting device i.e. a park position, a reference position, a filling position and a dispensing position (other dispensing positions being shown in broken line)
Figure 5B:
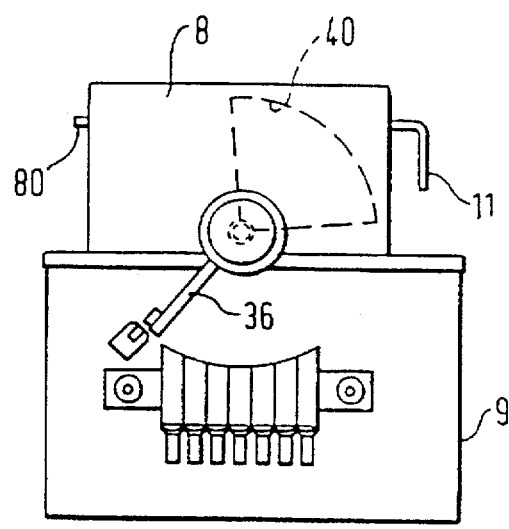
Figure 5C:
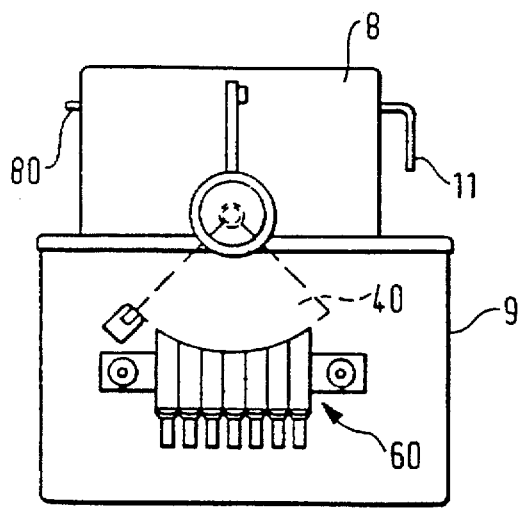
Figure 5D:
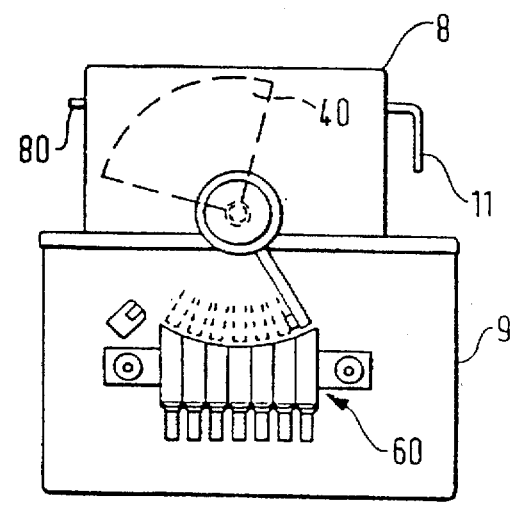
Figure 6A:
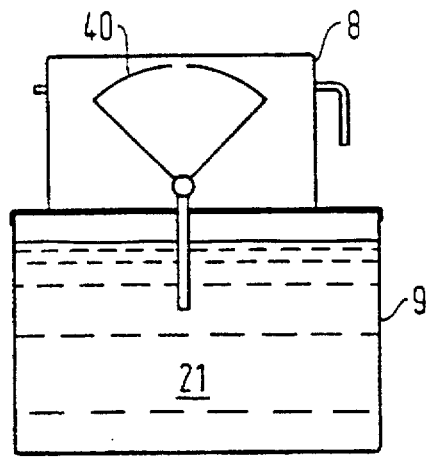
FIGS. 6A, 6B, 6C, 6D and 6E are schematic diagrams, to the same scale as in FIG. 5, of the system with the front of a tank cut away for clarity to show internally the different positions (correspondingly shown in FIGS. 5A, 5B, 5C and 5D) of the fluid collecting device and fluid level the tank, FIG. 6D showing the device at the start of a dispensing operation and FIG. 6E showing the device near the end of a dispensing operation.
Figure 6B:
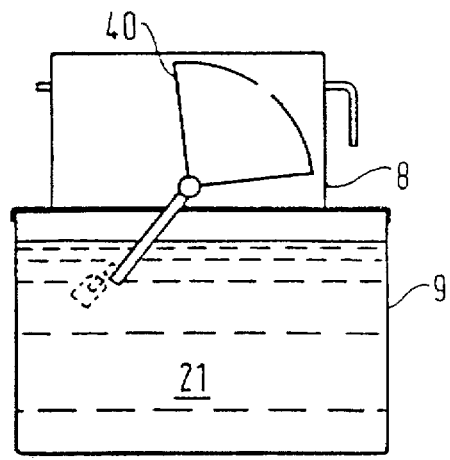
Figure 6C:
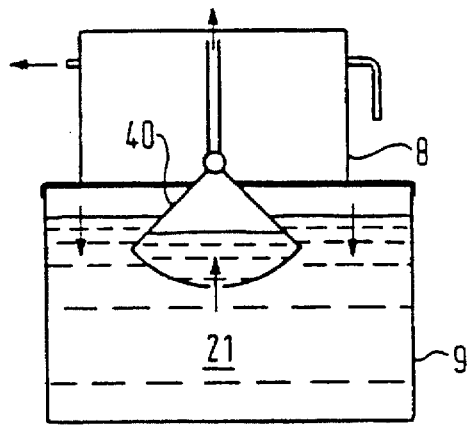
Figure 6D:
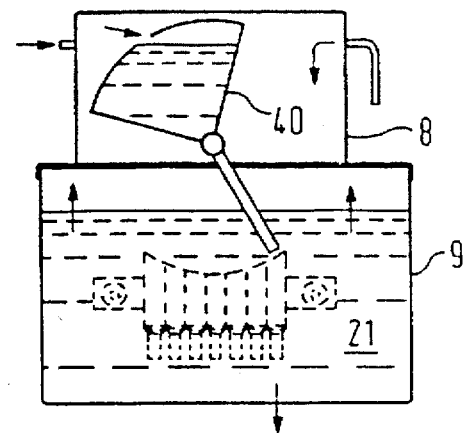
Figure 6E:
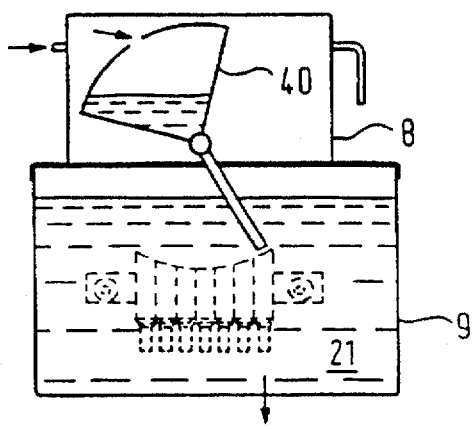

The fluid dispensing system operates in the following manner. The lower part 9 of the tank 10 is filled with water up to a predetermined level and kept at that level by replenishment controlled by the probe 13 to operate the replenishment valve. The water is heated by the immersion heater 23. The vessel 40, in its park position, is positioned in the upper part 8 of the tank 10 above the level of the water 21 in the lower part 9 of the tank 10. When a drink is selected on the machine, the motor 56 which is program controlled drives the wheel 50 so that the vessel 40 passes through the water 21 which enters the vessel 40 via hole 48. When the vessel 40 reaches a filling position as shown in FIGS. 5C and 6C, water enters the vessel 40 with the displaced air flowing freely out through the shaft 24 and outlet pipe 36. While the volume of the vessel 40 is determined, the amount of water which enters the vessel 40 is governed by the size of the hole 48 and the dwell time of the vessel 40 in its filling position, and the amount which is retained in the vessel 40 until it is dispensed therefrom in its dispensing position depends on the speed of rotation. FIGS. 6A, 6B, 6C, 6D and 6E illustrate the sequence of positions of the collecting device. Depending on the drink desired, the dispensing of the water may be into one or more chambers 60. For example, in one type of vending machine having separate containers for different powdered constituents for drinks in which the constituents are individually mixed with water prior to entering a cup, if the desired drink was white coffee with sugar, then the amount of water in the vessel would require to be discharged proportionately into three different chambers 60, i.e. those chambers connected up to a respective mixing zone for powered coffee, powdered whitener and powdered sweetner. When the collecting device reaches its dispensing position (s), the water begins to escape into the shaft 24 and out through outlet pipe 36 into the chamber(s) 60 opposite to which the pipe 36 is stopped by the motor 56. The positioning of the hole 48 and the speed of rotation substantially prevents onset of water discharge so that discharge of water into a chamber 60 does not take place until the wheel 50 has travelled far enough for the outlet pipe 36 to be opposite the appropriate chamber(s) 60 to make the selected drink.

Whilst the invention has been specifically described with reference to a drinks vending machine, it may have other applications where metered fluid dispensing is required, such as in the mixing of perfumes. Furthermore, it will be appreciated that the invention may be produced as a piece of equipment to be fitted to existing machines, especially drink vending machines, to replace their fluid dispensing systems.

Figure 2:
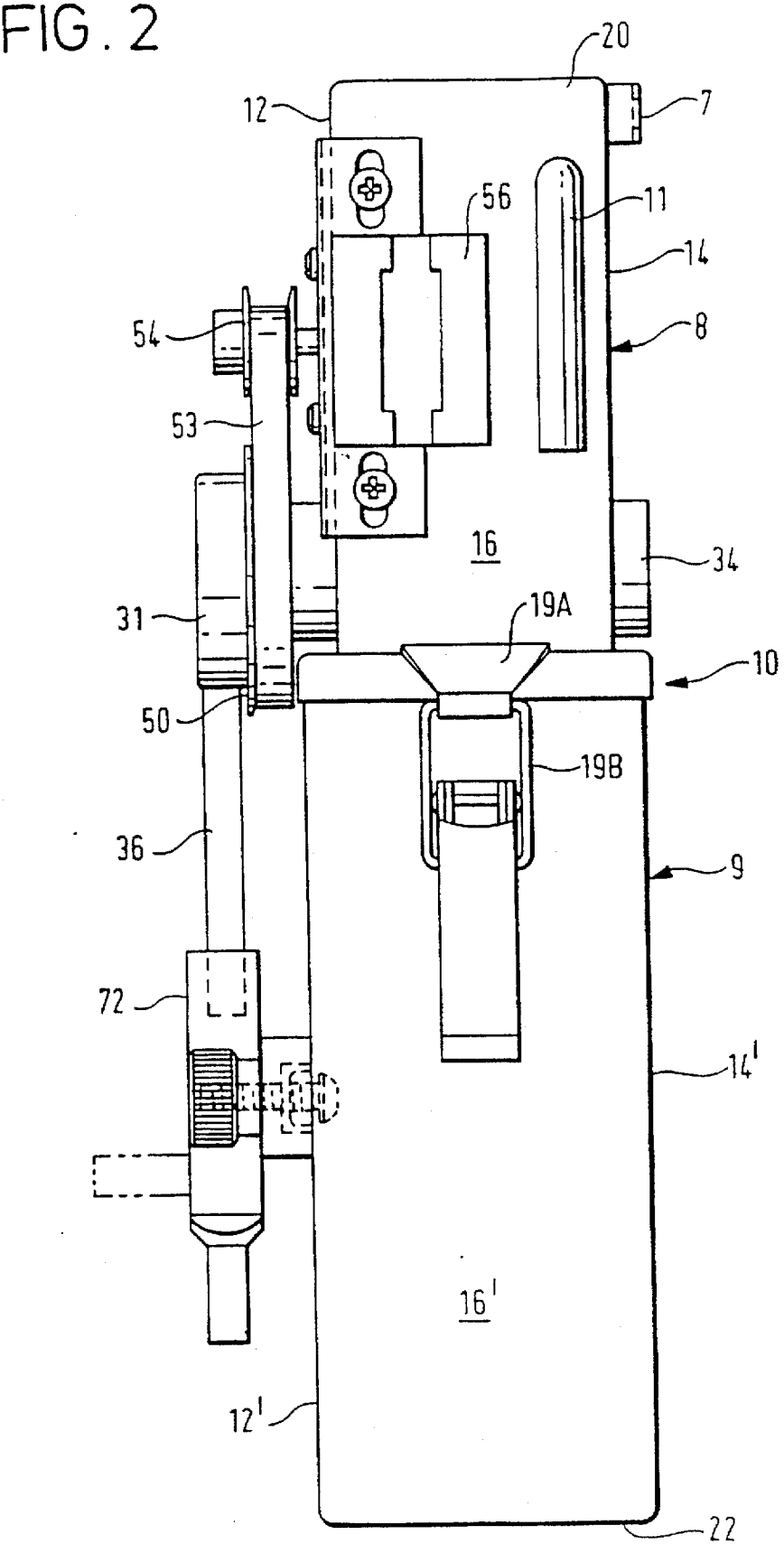
FIG. 2 is a side view in the direction of arrow 'A' shown in FIG. 1.
Figure 3:
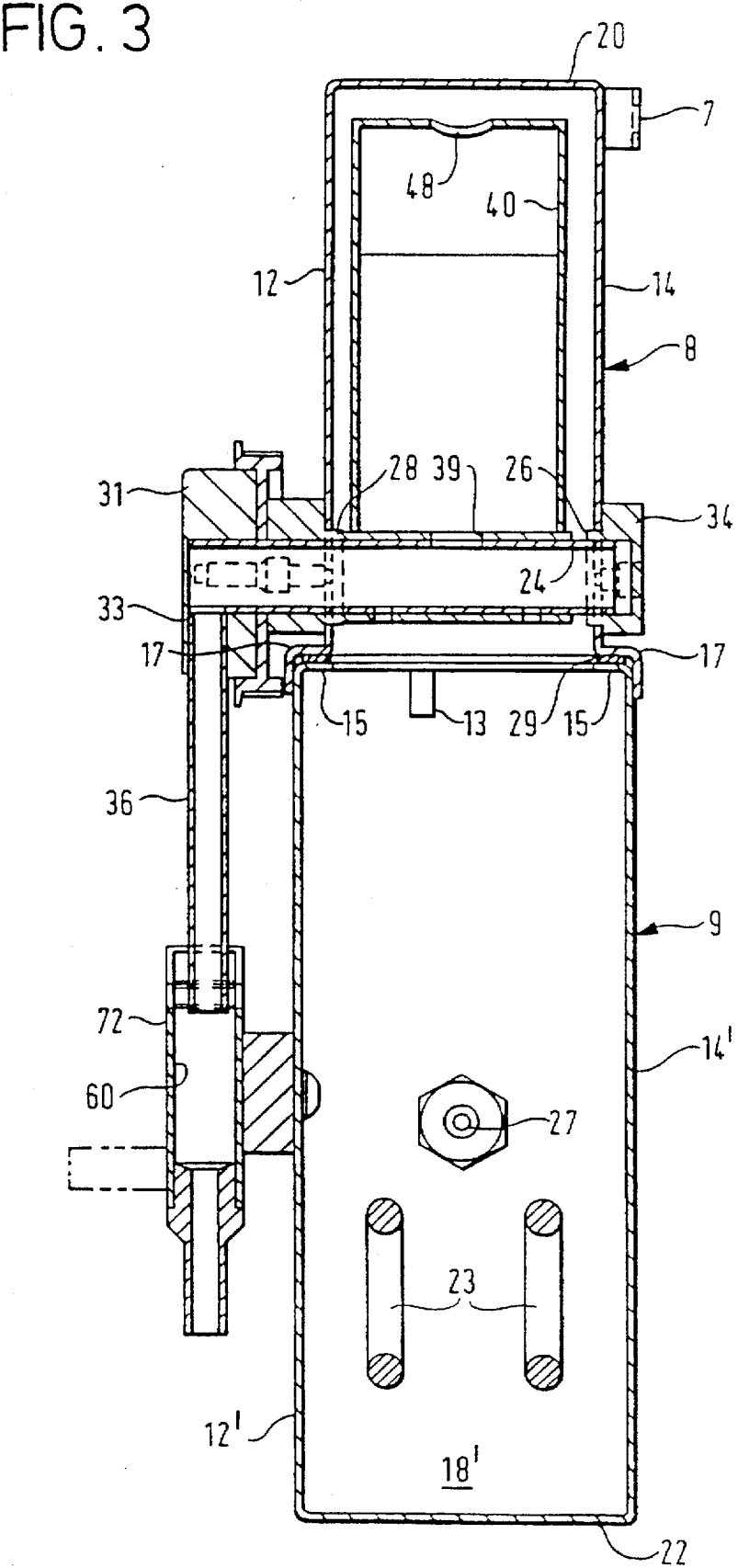
FIG. 3 is a cross-sectional view on the line III—III of FIG. 1.

In a first modification, the opening in the shaft 24 is simply along its length within the vessel 40. In a second modification (not shown), a volume restrictor screw is fitted to the outlet pipe 36 to control the volume of displaceable air therein and hence the rate of discharge of water through the outlet pipe 36. In a third modification, the outlet nozzle 62 of each chamber 60 may be at right angles to the axis of the chamber as shown in broken line in FIGS. 1 to 3 rather than axially aligned.

Variations and modifications can be made without departing from the scope of the invention described above and as claimed hereinafter.

I claim:

1. A fluid dispensing system comprising a tank for the fluid, and means for extracting a quantity of fluid from the tank and for directing the extracted fluid to one or more selected receptacles, the means comprising a fluid collecting device including a vessel and an outlet pipe in fluid communication, the vessel being for rotary passage through the tank and having a restricted entry aperture wherein the vessel and outlet pipe are connected through a rotatable tubular shaft which extends between two opposed walls of the tank and is journalled for rotation therein with one of its ends closed off and the other end projecting through the respective tank wall, the vessel being mounted on the shaft with the outlet pipe being connected to the projecting end of the shaft exteriorly of the tank to extend diametrically away from the vessel, with rotary passage of the vessel causing rotary passage of the outlet pipe outside of the tank, whereby, in use with fluid in tank, during a rotary cycle of the device air exhausts from the vessel through the outlet pipe as fluid ingresses into the vessel through the aperture during a filling operation, and air flows in to the vessel through the aperture as fluid is dispensed through the outlet pipe in a dispensing operation.

2. A fluid dispensing system according to claim 1, wherein a quantity of the fluid is raised from a supply thereof in the tank and discharged by gravity to the one or more selected receptacles.

3. A fluid dispensing system according to claim 1, wherein the outlet pipe has a volume control whereby the amount of air to be displaced in allowing fluid into the outlet is controlled.

4. A fluid dispensing system according to claim 1, wherein a plurality of upright elongate chambers are provided to receive fluid form the outlet pipe.

5. A fluid dispensing system according to claim 4, wherein the chambers each have an outlet for transferring any fluid received to a mixing zone where it is mixed with powdered and/or other liquid ingredients to produce a mixture.

6. A fluid dispensing system according to claim 4, wherein the chambers are arranged in a manifold of individual chambers.

7. A fluid dispensing system according to claim 6, wherein the tops of the chambers are arranged radially relative to the path traced out by the outer end of the outlet pipe during rotation.

8. A fluid dispensing system according to claim 1, wherein the tank is of two part construction comprising an upper part to which a lower fluid-holding part is removably secured.

9. A fluid dispensing system according to claim 8, wherein the upper part is mounted on a support.

10. A fluid dispensing system according to claim 8, wherein the shaft extends through the upper part of the tank to be closed on the outside of a rear side thereof and to be connected on the outside of the front side of the tank to the outlet pipe, at right angles to the shaft.

11. A fluid dispensing system according to claim 10, wherein a position sensing device is used to reference the position of the outlet pipe during rotation.

12. A fluid dispensing system according to claim 1, wherein the vessel being rotatable about the axis of the shaft passes through the fluid from a park position where it is out of the fluid to one or more selected positions of a plurality of dispensing positions to discharge through the outlet pipe fluid collected during its rotation between said park and dispensing positions.

13. A fluid dispensing system according to claim 12, wherein the shaft is rotated by an electrically operated motor that is program controlled.

14. A fluid dispensing system according to claim 13, wherein the shaft has a toothed wheel thereon with a toothed belt drive employed to mesh with a toothed output gear of the motor to rotate the wheel.

15. A fluid dispensing system according to claim 13, wherein the motor is mounted on the outside of a side of the tank.

16. A fluid dispensing system according to claim 13, wherein the motor is programmed to rotate the vessel from its park position through a reference position and a filling position to one or more discharge positions according to the desired combination of chambers necessary for producing the selected mixed product.

17. A fluid dispensing system according to claim 1, wherein the vessel is closed and the restricted entry aperture is a circular hole.

18. A fluid dispensing system according to claim 17, wherein the amount of fluid which ingresses into the vessel depends on the size of the hole and the dwell time during which the vessel is in the fluid in the tank.

19. A fluid dispensing system according to claim 17, wherein the volume of fluid retained in the vessel when moving from a filling position to a dispensing position depends on the size of hole and the speed of rotation.

20. A fluid dispensing system according to claim 17, wherein the vessel is sectoral in side elevation, and is mounted at its vertex on the rotatable tubular shaft.

21. A fluid dispensing system according to claim 20, wherein the vessel has two sectoral sides spaced apart by radial walls and an arcuate wall in which the opening is provided.

22. A fluid dispensing system according to claim 20, wherein the wall of the shaft within the vessel is perforate to admit fluid with a single or multiple openings.

23. A fluid dispensing system according to claim 22, wherein the single opening is elongate along its length.

* * * * *